UNITED STATES PATENT OFFICE.

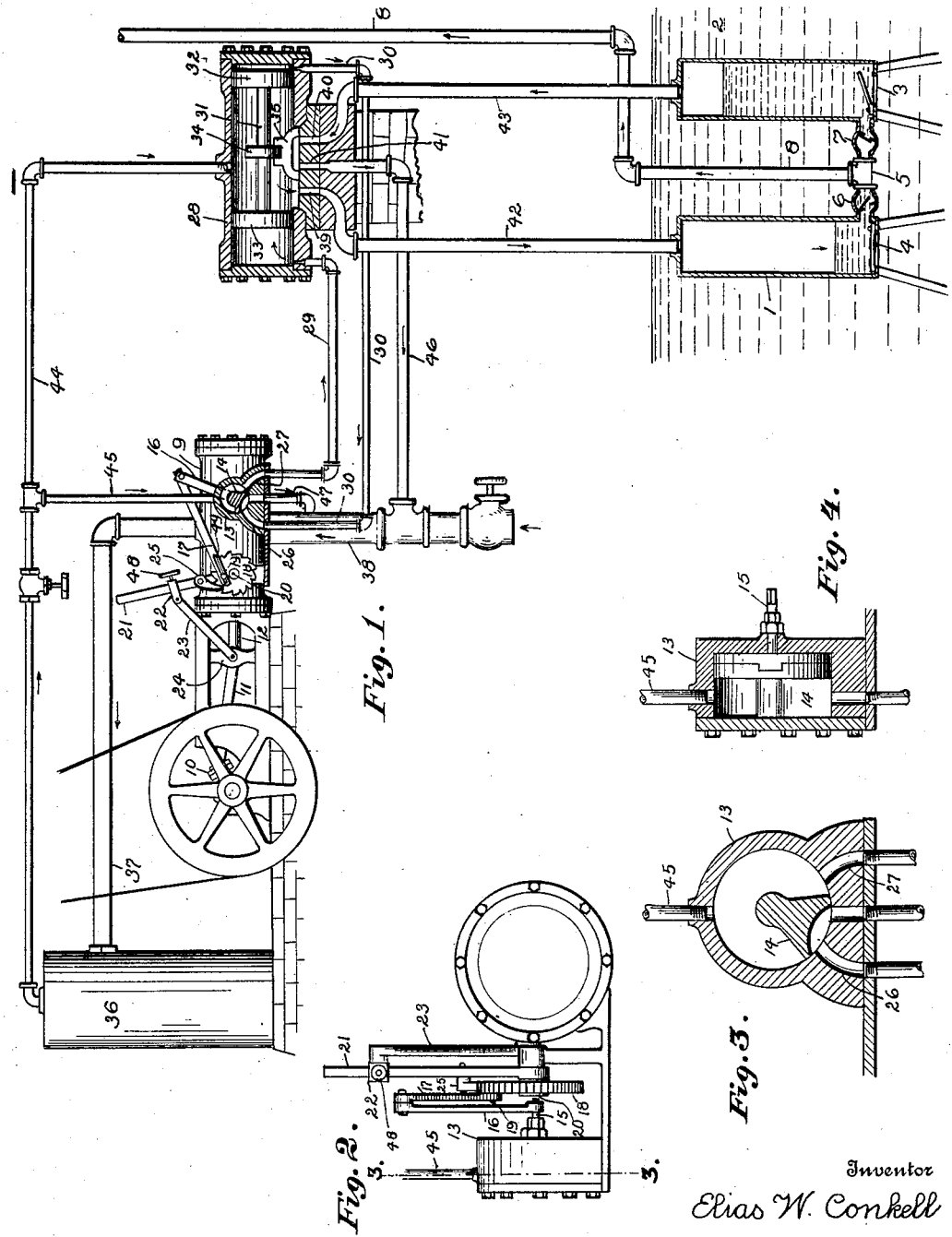

ELIAS W. CONKELL, OF CANTON, OHIO.

CONTROLLER FOR PNEUMATIC PUMPS.

No. 899,101.   Specification of Letters Patent.   Patented Sept. 22, 1908.

Application filed April 25, 1907.  Serial No. 370,141.

*To all whom it may concern:*

Be it known that I, ELIAS W. CONKELL, a citizen of the United States, residing at Canton, in the county of Stark and State of Ohio, have invented certain new and useful Improvements in Controllers for Pneumatic Pumps; and I do hereby declare that the following is a full, clear, and exact description of the same, reference being had to the accompanying drawing, making a part of this specification, and to the numerals and figures of reference marked thereon, in which—

Figure 1 is a view showing all of the different parts of a pumping system connected and properly arranged with reference to each other showing parts in section. Fig. 2 is an end view of the compressor cylinder showing the regulating mechanism in proper position with reference to said air compressing cylinder. Fig. 3 is a section on line 3—3, Fig. 2. Fig. 4 is a view taken at right angles to Fig. 3

The present invention has relation to controllers for pneumatic pumps of the class and kind in which the water is elevated by means of compressed air and the present invention has more specific reference to the controlling of air and alternating pressure of air in one cylinder and the releasing of air in the other, and it consists in the novel arrangement hereinafter described and particularly pointed out in the claims.

Similar numerals of reference indicate corresponding parts in all the figures of the drawing.

In the accompanying drawings, 1 and 2 represent the water tanks or cylinders, which are submerged or partially submerged in the body of the water. It will be understood that the tanks or cylinders 1 and 2 must be provided at their bottom ends with the check valves 3 and 4, which are of the ordinary construction; the tanks or cylinders 1 and 2 are connected at their bottom or lower ends by a pipe 5, which pipe is provided with the check valves 6 and 7. To the pipe 5 is connected the water conveying pipe 8, which water conveying pipe may lead to any place where it is desired to deliver water. The air compressor cylinder 9 is of the ordinary construction and is supplied with the usual piston, which is driven back and forth by means of the crank 10, the pitman 11 and the piston rod 12. All of which parts are of ordinary construction and need no description here.

At one side of the air compressing cylinder 9 is located the shift valve casing 13, in which casing is located the shift or rock valve 14, which shift or rock valve is mounted upon the shaft 15 to which shaft is connected the lever 16 and to the top or upper end of the lever 16 is pivotally attached the slotted link 17, which slotted link is connected to the ratchet wheel 18 or its equivalent by means of the wrist pin 19. The ratchet wheel 18 is mounted upon the shaft 20 to which shaft is pivotally attached the lever 21, upon which lever is adjustably attached the clip 22, to which clip is pivotally attached the link 23, which link is extended and connected to the cross head 24 or its equivalent. It will be understood that it is immaterial as to what part of the compressor proper the link 23 is attached as the only object is to provide a means for imparting a swinging movement to the lever 21. To the lever 21 is pivotally attached the detent 25, which detent engages the teeth of the ratchet wheel and moves said ratchet wheel when the lever is moved in one direction and rides over the teeth when moved in the opposite direction thereby imparting an intermittent rotary movement to the ratchet wheel 18.

It will be understood that a rocking movement will be imparted to the shift or rock valve 14, thereby opening and closing the ports 26 and 27, which ports are connected to the valve cylinder 28 by means of the pipes 29 and 30, which pipes lead to and are connected to the opposite ends of the valve cylinder 28. Within the valve cylinder 28 is located the piston rod 31, to which rod are connected the pistons 32 and 33. To the piston rod 31 is connected the head 34, which head is for the purpose of actuating the sliding valve 25. At any convenient place is located the storage tank 36, to which storage tank leads the pipe 37, which pipe is so connected that by the action of the air compressor, air will be forced into the storage tank 36, and for the purpose of supplying air to the compressor cylinder the air pipe 38 is provided. Below the valve cylinder 28 and communicating therewith are located the ports 39, 40 and 41. The ports 39 and 40 are alternately opened and closed by means of the slide valve 35. From the port 39 leads the air pipe 42 and is connected to the submerged tank or cylinder 1, and from the port 40 leads the air pipe 43, which pipe is connected to the tank or cylinder 2. For the purpose of maintaining an equal pressure of air in the air chamber 28 as that in the storage tank 36 the pipe 44 is provided, which pipe is connected to the storage tank 36 and to the valve cylinder 28. Let it be assumed that port 39 is opened as shown in the drawings, at which time the compressed air is forced into the tank or cylinder 1 and on top of the water contained therein, which air pressure forces the water through the valve 6, and into the pipe 8. During this time the port 40 is closed and the air pressure cut off from the tank or cylinder 2, thereby allowing said tank or cylinder to fill with water or the water in the tank find its level with the surrounding water and if the tank be entirely submerged, each tank will be filled to its top or upper end. After the tank 1 has been emptied the rock or shift valve is so turned that it will close the port 27 and open the port 26, at which time the compressed air will find its way through the pipe 30 and drive the pistons 32 and 33 in the direction to close the port 39 and open the port 40, at which time the compressed air will be forced onto the top of the water contained in the tank or cylinder 2 and force the water into the pipe 8, and after the tank or cylinder 2 has been emptied the rock or shift valve is again rocked and the compressed air forced into the tank 1, by which arrangement one of the tanks is being emptied and the other filled at all times.

For the purpose of providing sufficient air pressure to actuate the pistons 32 and 33 the pipe 45 leads from the pipe 44 to the valve casing 13. When a tank is being filled the air displaced by the water passes upward through the pipe 43 and into the valve chamber 28 and thence through the port 41, and the pipe 46, by which arrangement the air can be used without any necessity of supplying the full amount of air from the surrounding atmosphere.

It will be understood that when the pistons 32 and 33 move the air back of the cylinder must be displaced and is conveyed to the valve cylinder 13 by the pipes 29 and 30 and for the purpose of conveying this air to the air compressor, a short pipe 47 is provided, which short pipe leads to and is connected with the pipe 38. It is of importance that the tanks 1 and 2 be practically filled with water and in order to so time the rock or shift valve 14 the clip 22 is adjustably connected to the lever 21 and is held in fixed adjustment by means of the thumb screw 48 or its equivalent, by which arrangement the lever 21 is given a long or short throw, reference being had to the distance the clip 22 is set from the pivotal point of said pivoted lever. It will be understood that the rock valve must remain at rest during the time the tanks 1 and 2 are being emptied and filled, and in order to provide for the non-movement of the valve 14 while one tank is being emptied and the other filled the link 17 is provided with the slot 49 by which arrangement the wrist pin 19 will not impart any movement to the lever 17 during the time the wrist pin 19 is passing from one end of the slot to the other.

It will be understood that when the lever 22 is given a long throw the detent 25 will pass over a greater number of the teeth of the ratchet wheel, thereby moving the ratchet wheel a greater distance when the detent is engaged with the teeth. It will be understood that when one of the tanks or cylinders is being filled the air located above the water line is withdrawn by means of the compressor, said air passing upward through the pipe connected to the pipe and into the valve cylinder 28 and thence out from the valve cylinder through the port 41, and the pipe 46, which pipe is connected to the intake pipe of the compressor cylinder, by which arrangement a partial vacuum is created. It will be understood that by removing the air from the top of the cylinder or tank being filled that each tank will be filled to its top regardless of the distance the tanks are submerged.

Having fully described my invention, what I claim as new and desire to secure by Letters Patent, is—

1. The combination with an air compressor cylinder and its piston, of a valve casing at one side thereof, a rock valve therein, a valve cylinder, a piston therein, ports and connections between said casing and valve cylinder, a lever on the shaft of said rock valve, a slotted link pivotally connected at one end to said lever, a ratchet, a wrist pin thereon connected pivotally with the slotted end of said link, a lever pivotally attached to the shaft of the ratchet, a gravitating detent pivotally attached to said lever, a cross head connected with the piston of the compressor cylinder, and a link pivotally connected to the cross head and the last named lever.

2. The combination with an air compressor and its piston, of a valve casing, a rock valve therein, a valve cylinder, a piston therein, ports and connections between said casing and valve cylinder, a lever on the shaft of said rock valve, a slotted link pivotally connected at one end to said lever, a ratchet, a wrist pin attached thereto and connected pivotally with the slotted end of said link, a lever pivotally attached to the shaft of the ratchet, a gravitating detent pivotally attached to said lever, a cross head connected with the piston of the compressor cylinder, and a link adjustably connected to the last-named lever and pivotally connected with the cross head.

3. The combination with an air compressor cylinder and its piston, of a valve casing, a rock valve therein, a valve cylinder, a piston therein, ports and connections between said casing and valve cylinder, a lever on the shaft of the rock valve, a slotted link pivotally connected at one end to said lever, a ratchet connected with said link, a lever pivotally attached to the shaft of the ratchet, a gravitating detent pivotally carried by the last-named lever, a cross head connected with the piston of the compressor cylinder, a link connected to the last-named lever and pivotally connected with the cross head, a storage tank, a pipe connecting the same and the air compressor cylinder, and a pipe connecting the said storage tank and the piston cylinder.

4. The combination with an air compressor cylinder and its piston, of a valve casing, a rock valve therein, a valve cylinder, its piston, ports and connections between said casing and valve cylinder, a lever on the shaft of the rock valve, a slotted link pivotally connected at one end to said lever, a ratchet connected with said link, a gravitating detent for engagement with said ratchet, a lever pivotally attached to the shaft of said ratchet and carrying said detent, a cross head connected with the piston of the compressor cylinder, a link connected to the last named lever and pivotally connected with the cross head, a storage tank, a pipe connecting the same and the air compressor cylinder, a pipe connecting the said storage tank with the piston cylinder, and a pipe leading from the last named pipe to the valve casing.

In testimony that I claim the above, I have hereunto subscribed my name in the presence of two witnesses.

ELIAS W. CONKELL

Witnesses:
J. A. JEFFERS,
F. W. BOND.